3,647,624
TREATMENT OF BLOOD WITH OLEAGINOUS SUBSTANCE

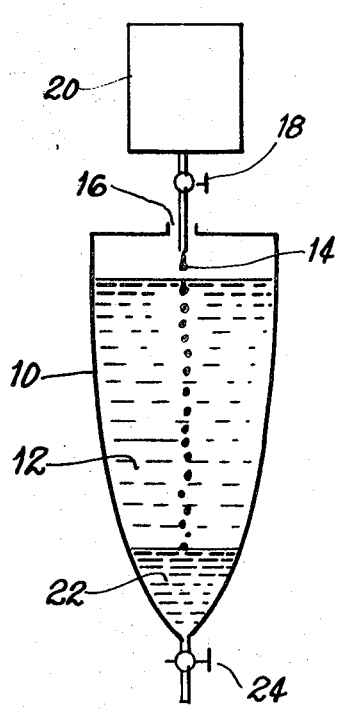
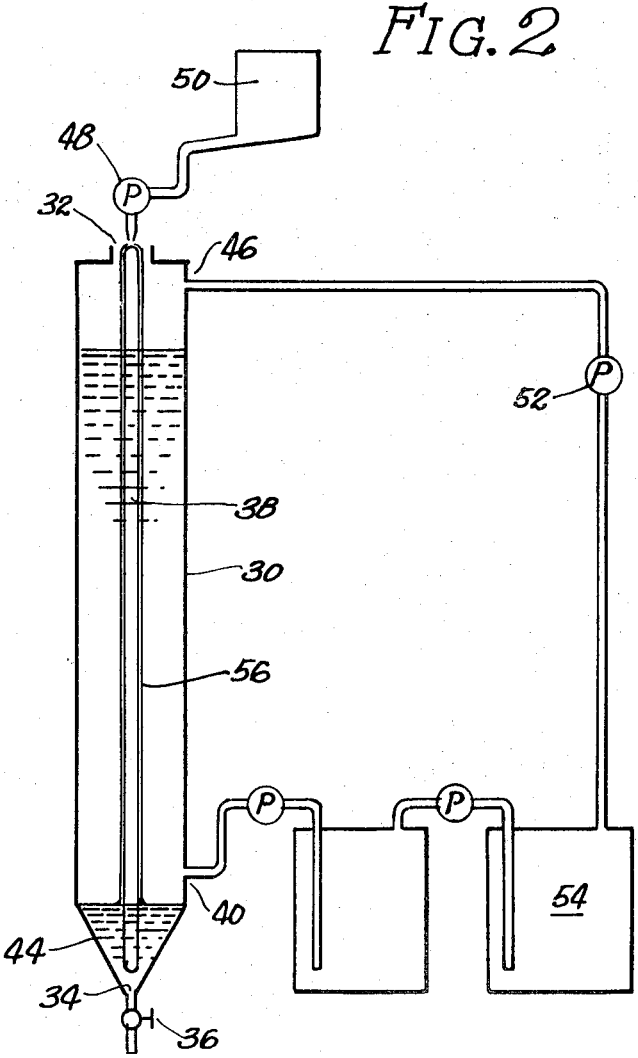
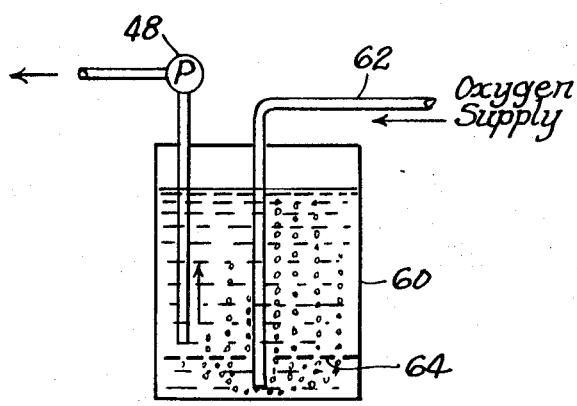

Merle A. Evenson, Madison, Wis., assignor to Wisconsin Alumni Research Foundation, Madison, Wis.
Filed July 24, 1969, Ser. No. 844,426
Int. Cl. A61k 27/10
U.S. Cl. 195—1.8
20 Claims

ABSTRACT OF THE DISCLOSURE

Method and means for the treatment of blood and other body fluids to add or subtract ingredients with respect to the blood by passing the blood in liquid-liquid contact with an immiscible oleaginous material.

---

This invention relates to the treatment of blood and other body fluids by liquid-liquid contact with an oleaginous substance and it relates more particularly to the treatment of blood or other body fluids for the addition or subtraction of constituents by exchange with a blood immiscible oleaginous carrier while in liquid-liquid contact therewith.

To the present, treatment of blood to effect removal of unwanted constituents or for purification has been effected by hemodialysis in which use in made of a semi-permeable membrane to separate the blood from the dialysate. Such a membrane has been found to constitute a rate limiting factor to the purification of blood.

Attempts have been made, in artificial kidneys, to process the blood by direct contact with solid material, such as charcoal, sephadex, and ion exchange resins to effect removal of blood urea nitrogen, including uric acid and creatinine. With charcoal, excessive cell damage has been experienced and with sephadex, platelets were lost to the dextran materials, while ion exchange materials were found to be incapable of removal of certain ingredients, such as the drug boriden (glutethimide).

Direct gas-liquid interchange has been tried in artificial lung devices. Some red blood cells are ruptured at the gas-liquid interface in such artificial lung devices.

Thus, it is an object of this invention to provide a method and means for the treatment of blood and other body fluids for the removal of undesirable ingredients in the purification of the blood, or for the addition of ingredients for improving the characteristics of the blood, or for introducing oxygen to oxygenate the blood, and it is a related object to provide a method and means of the type described which is extremely gentle on the blood and other body fluids, which does not cause excessive rupture of blood cells, which does not effect removal of excessive amounts of platelets or other blood cells from the blood, which is not destructive to the blood or other body fluids, which does not constitute, a limiting factor in the rate of purification of the blood or other body fluids, which does not cause excessive fragmentation of blood cells, and which does not tend to produce blood clots.

These and other objects and advantages of this invention will hereinafter appear and for purposes of illustration, but not of limitation, embodiments of the invention are shown in the accompanying drawing in which:

FIG. 1 is a schematic elevational view of a simple device for carrying out the practice of this invention;

FIG. 2 is a schematic elevational view of a modification in a device suitable for use in the practice of this invention; and FIG. 3 is a schematic elevational view of a portion of the device to oxygenate blood.

In accordance with the practice of this invention, the blood or other body fluid to be processed is passed in direct liquid-liquid contact with an oleaginous material, preferably in the form of a vegetable oil, such as corn oil, It has been found that the oil is very gentle on the blood in that it does not materially affect the cells of the blood or cause rupture thereof nor are the platelets removed or affected by direct contact with the oil. The oleaginous material is immiscible with the blood or other body fluids so as to enable clean and complete separation between the blood or other body fluids and the oleaginous treating liquid.

It has been found further that the oleaginous liquid is capable of use as a carrier for the liquid-liquid extraction of unwanted constituents for removal from the blood or for liquid-liquid exchange to introduce desirable ingredients into the blood, such as when the carrier liquid is used as an oxygenator to carry oxygen for addition to oxygenate the blood.

The removal of unwanted constituents from the blood or the addition of constituents to the blood will depend somewhat upon the characteristics of the oleaginous carrier which is put into liquid-liquid contact with the blood or other body fluids. For example, when blood carrying an excessive dosage of a drug, such as doriden, barbiturates, mysolin and the like is passed in liquid-liquid contact with corn oil or other vegetable oil, substantial amounts of such unwanted ingredients are extracted from the blood by such oleaginous carrier whereby the levels of such drugs in the blood are materially reduced. Similarly, when the oleaginous liquid carrier is in the form of an unsaturated oil, such as linseed oil, safflower seed oil, soya oil and the like, substantial amounts of cholesterol and bilirubin are dissolved from the blood into the oleaginous carrier during liquid-liquid contact to effect reduction in the level thereof in the blood. Removal of blood urea nitrogen, uric acid and creatinine and the like can be effected by passing the blood in liquid-liquid contact with an oleaginous material modified to constitute an ion exchange material, such as by modification to introduce amine groups into the oil. Similarly by tailoring the oleaginous liquid carrier to present anionic exchange characteristics, removal can be effected of phosphorus and other compounds in response to liquid-liquid exchange between the blood or other body fluids and the oleaginous carrier liquid.

As used herein, the term "blood" is meant to include blood and constituents of blood such as red blood cells, white blood cells and serum, and body fluids such as lymph fluid and spinal fluid and the like.

The term "oleaginous liquid" refers to natural and synthetic water immiscible oils such as mineral oil and petroleum oil, and preferably vegetable oils including saturated oils such as corn oil, peanut oil, cottonseed oil, olive oil, and the like, and unsaturated oils, such as soya oil, linseed oil, oiticica oil, safflower seed oil, chinawood oil and the like, and synthesized oils such as the triglycerides of oleic, stearic and palmitic and the like $C_{12}$ to $C_{24}$ acids. Included are oils which have been modified or tailormade for particular applications, such as oils or oleaginous materials modified to include cationic or amine groups, including primary, secondary or tertiary amines, as represented by the liquids having a carbon length varying from 12 to 25 carbon atoms and marketed by Rohm & Haas under the trade names Premine JM-T (a primary amine containing 18 to 22 carbon atoms), Premine 84-R (a primary amine containing 12 to 14 carbon atoms) or Amberlite Al (a secondary oleaginous amine), and Alamene 336-S (a tertiary oleaginous amine), or which are modified to embody cationic groups, such as $SO_3$ groups and the like.

In the practice to add or subtract constituents with respect to the blood, the blood is passed in contact with the oleaginous material and then separated therefrom by natural separation due to the differences in specific gravity and solubility. It is desirable to maximize the amount of surface contact between the blood and the oleaginous carrier liquid. For this purpose, the blood can be introduced dropwise for passage through a pool of the oleaginous liquid. Instead, the blood can be passed through the oleaginous liquid in the form of a continuous stream and preferably in the form of a thin layer spread out over a suitable surface arranged to extend through the body of the oleaginous material, such as a glass or plastic rod or tube extending through the oleaginous liquid system, or vice versa, the oleaginous liquid can be passed in the manner described but preferably in the opposite direction through the blood for contact therewith followed by separation due to their differences in specific gravity and immisicibility.

When used as an oxygenator, oxygen can be bubbled through the oleaginous material for absorption of oxygen into the carrier liquid whereby the oxygen is transferred from the carrier liquid to the blood during the liquid-liquid contact therewith. Other gaseous or solid components incapable of direct contact with the blood can be introduced into the blood by first incorporating such gaseous liquid or solid component into the oleaginous carrier liquid, as by solution or absorption, and then passing the blood into liquid-liquid contact with the oleaginous carrier for effecting the desired exchange.

When used as an extractor to remove unwanted materials, such as cholesterol, bilirubin, uric acid, blood urea nitrogen, creatinine, phosphorus compound and the like, or drugs such as doriden, mysolin, barbiturates and the like from the blood, the blood is passed in liquid-liquid contact with a purified oleaginous material for transfer of the unwanted ingredient from the blood to the oleaginous carrier which thereafter separates by reason of differences in specific gravity and immiscibility. The separate oleaginous material can be subsequently treated to remove the ingredient extracted from the blood and recycled one or more times for liquid-liquid contact with the blood for extraction.

While not equivalent, instead of modification of the oleaginous material to tailormake the oleaginous material for extraction or addition of a particular component with respect to the blood, anionic or cationic materials or both, which are compatible with the oleaginous material and immiscible with the blood, can be combined with the oleaginous material in small amounts for the desired treatment. The oleaginous carrier liquid can also be diluted with organic solvent liquids, particularly polar solvents, which are incompatible with the blood, for increasing the fluidity of the oleaginous character and/or for modifications of its characteristics. It is preferred, however, to make use of purified oleaginous material alone, since such materials are gentle on the blood and not harmful to the cells or platelets which forms an essential part of the blood.

An apparatus, suitable for use in the practice of this invention, is shown in laboratory scale in FIG. 1 in which the numeral 10 indicates a glass separatory vessel adapted partially to be filled with corn oil or other oleaginous material 12. Blood is introduced dropwise 14 through an open end 16 at the top of the vessel from a dropper outlet 18 at the bottom of a storage vessel 20. By reason of the differences in specific gravity and immiscibility, the drops 14 of blood pass continuously downwardly through the body of oleaginous material 12 and collect to form a separate layer 22 at the bottom of the separatory vessel. The treated blood can be drained from the vessel batchwise or continuously at a rate corresponding to the rate of addition by proper adjustment of the stop cock 24 to maintain a layer of blood at the bottom of the vessel.

A more sophisticated arrangement, which is capable of adaptation for batch or continuous operation, is shown in FIG. 2 in which liquid-liquid contact is carried out in an elongate vertically disposed vessel 30 having an inlet opening 32 at the top and an outlet opening 34 at the bottom fitted with a stop cock 36 for controlling the rate of drainage of blood from the vessel. An elongate rod or tube 38 extends through the vessel from the inlet opening 32 to the outlet 34 and the vessel is provided with an inlet 40 in the lower portion above the conically shaped separatory section 44 of the vessel and an outlet 46 adjacent the top of the vessel for introduction of corn oil or other oleaginous material to fill the vessel or for continuous circulation of corn oil or other oleaginous material upwardly through the vessel from the inlet 40 to the outlet 46. Blood is continuously pumped by pump 48 from a supply container 50 to the upper end of the rod 38 for flow as a thin film over the rod downwardly through the body of oleaginous material. The blood separates to form a separate layer in the conically shaped separatory portion 44 for removal from the system at a rate controlled by the stop cock 36. The oleaginous material exhausted from the vessel through outlet 46 can be circulated by pump 52 to a purifier 54. In the purifier, the materials extracted from the blood can be removed, as by treatment with sephadex and the oleaginous material prepared for return to the storage vessel.

FIG. 3 is a schematic illustration of a means for providing the oleaginous carrier with a gaseous component such as oxygen, to oxygenate the blood. As shown in the drawing, a vessel 60 is provided in which the oleaginous material is housed, with a tubing 62, connected to a source of oxygen supply, extending downwardly through the vessel to a level below a diffuser plate 64 whereby the oxygen gas issuing from the tubing is diffused for passage as fine bubbles 66 upwardly through the oleaginous liquid for absorption therein. The oxygenated oleaginous material is then passed in liquid-liquid contact with the blood, as by the apparatus shown in FIG. 1 or 2.

Having described the basic concepts of the invention, illustration of the invention will now be made by way of the following examples, which are given by way of illustration and not by way of limitation:

EXAMPLE 1

Blood serum was introduced dropwise for passage through a body of corn oil having a depth of about 2 to 3 inches, as in the cell shown in FIG. 1. After a single pass, the level of doriden in the blood serum was reduced from a level of 3.5 mg. per 100 ml. to a level of 0.45 mg. per 100 ml. without any noticeable undesirable effect on the serum.

This is a significant achievement because removal of doriden to reduce the level in blood is important, especially when an overdose has been ingested. To the present, there has not been a fast and effective method or means for removal of such drugs from the blood stream.

EXAMPLE 2

In the apparatus shown in FIG. 2, the blood was passed downwardly as a thin film 56 over the glass rod 38, having a length of 9 cm., at a flow rate of 8 ml. per minute at 25° C. The cell was filled with corn oil.

The following Table I sets forth the analysis of the blood before and after treatment.

TABLE I

| Component analyzed | Units | Pre-treatment value | Post treatment value |
|---|---|---|---|
| $Na^+$ | Meg./l | 146 | 145 |
| $K^+$ | Meg./l | 3.4 | 3.5 |
| $Cl^-$ | Meg./l | 112 | 112 |
| $CO_2$ | Meg./l | 21.8 | 21.2 |
| Chol | Mg./100 ml | 183 | 179 |
| $Ca^{+2}$ | Mg./100 ml | 8.1 | 8.1 |
| $PO_4^{-2}$ | Mg./100 ml | 2.6 | 2.5 |
| T. Bilirubin | Mg./100 ml | 0.4 | 0.5 |
| Albumin | G./100 ml | 3.5 | 3.4 |
| T.P | G./100 ml | 6.6 | 6.5 |
| Uric acid | Mg./100 ml | 6.2 | 6.1 |
| BUN | Mg./100 ml | 14 | 14 |
| Glucose | Mg./100 ml | 78 | 78 |
| LDH | Wacker | 141 | 225 |
| Alk. Ptase | King-A | 7 | 8 |
| SGOT | Karmen | 21 | 27 |
| T. Lipid | Mg./100 ml | 860 | 700 |
| HCT | Percent | 41 | 41 |
| HGB | G./100 ml | 14.3 | 14.4 |
| RbC | $\times 10^6$ mm.$^3$ | 4.8 | 4.8 |
| Platelets | $\times 10^5$ mm.$^3$ | Normal | Normal |
| WBC | $\times 10^5$ mm.$^3$ | 5.1 | 5.1 |
| Seg | Percent | 67 | 65 |
| Bands | do | 2 | 1 |
| Lymphocytes | do | 28 | 30 |
| Monocytes | do | 2 | 4 |
| MVC | | 85.5 | 85.6 |
| MCH | | 29.9 | 29.9 |
| MCHC | | 34.9 | 35.0 |
| Serum Hgb | Mg./100 ml | | |
| PBI | Hg/100 ml | | |
| Doriden | Mg./100 ml | 1.9 | 1.2 |

NOTE.—T.P.=Total Protein; BUN=Blood Urea Nitrogen; LDH= Lactic dehydrogenase; Alk. Ptase.=Alkaline phosphatase; SGOT= Serum glutamic oxalacetic transaminase; T. Lipid=Total Lipid; HGB= Hemoglobin; HCT=Hematochrit; RbC=Red Cell count; WBC= White Blood count; MCV=Mean corpuscular volume; MCH=Mean corpuscular hemoglobin; MCHC=Mean corpuscular hemoglobin concentration; Serum Hgb=Serum hemoglobin; PBI=Protein bound iodine; Doriden=Glutethimide.

It will be observed that the glutethimide (Doriden) was reduced from a level of 1.9 mg. per 100 ml. to 1.2 mg. per 100 ml. without significant change in the other ingredients of the blood. The rate of extraction can be increased by operation under increased temperature. For example, the rate of extraction can be about doubled by operation at a temperature of about 37° C. instead of 25° C.

EXAMPLE 3

This example relates to the application of the invention to oxygenate blood. For this purpose, about 20 ml. of U.S.P. corn oil was equilibrated with pure oxygen by bubbling the oxygen through the oil for about one hour, as in a device shown in FIG. 3. When measured, as by a Clark-Collup electrode, the partial pressure of oxygen ($PO_2$) was found to be 100 mm. of mercury. Venous blood was measured for pH and for $PO_2$ prior to treatment. The venous blood was then passed in liquid-liquid contact with the oxygen saturated corn oil and the pH and $PO_2$ of the venous blood was measured after treatment with the following results:

| | Pre | Post |
|---|---|---|
| pH | 7.44 | 7.90 |
| $PO_2$, mm. of Hg | 75 | 360 |

It will be observed that the venous blood is aerated markedly to increase its oxygen content. The pH can be maintained at initial levels if use is made of oxygen gas containing carbon dioxide.

EXAMPLE 4

This example will illustrate treatment with an ionic oil containing primary amine groups.

100 ml. of serum was treated by liquid-liquid contact with 10 ml. portions of two different ionic exchange oils by passing the serum dropwise through the oil, as in an apparatus of the type shown in FIG. 1. The serum was analyzed before and after treatment with the results set forth in the following Table II:

TABLE II

| | Pretreated Serum value | Premene JM-T primary amine $C_{18}$-$C_{22}$ | Premene 81-R primary amine $C_{12}$-$C_{24}$ |
|---|---|---|---|
| $Ca^{+2}$ | 9.2 | 9.0 | 9.2 |
| $PO_4^{-3}$ | 4.1 | 3.8 | 4.0 |
| Glucose | 116 | 116 | 114 |
| BUN | 21 | 21 | 20 |
| Uric | 5.8 | 5.6 | 5.6 |
| Cholesterol | 225 | 114 | 192 |
| T.P | 7.0 | 7.2 | 7.0 |
| Albumin | 3.7 | 4.0 | 5.2 |
| T. Bilirubin | 0.5 | 0 | 0.3 |
| Alk. Ptase | 80 | 89 | 82 |
| LDH | 180 | 105 | 166 |
| SGOT | 38 | 31 | 37 |
| Na (meq./l.) | 145 | 143 | 144 |
| K | 4.8 | 4.7 | 4.7 |
| Cl | 101 | 102 | 107 |
| Creat | 1.3 | 1.3 | 1.3 |

It will be seen that the cholesterol content is reduced in both instances, with a 50% reduction being achieved with Premene JM-T. The reduction in total bilirubin is significant.

It will be understood that the liquid-liquid contact between blood and liquid oleaginous materials, to add or subtract components with respect to the blood, may be carried out at temperatures which may be varied within a range wherein the characteristics of the blood are not affected with corresponding variations in the rate of treatment and that the liquid-liquid contact can also be carried out at various pressures ranging from subatmospheric pressures to positive pressures within practical ranges for the equipment.

It will be apparent from the foregoing that I have provided a method and means for blood treatment which is capable of wide variation in the rate of treatment as well as the type of treatment without harmfully affecting the desirable characteristics and components making up the blood or other body fluids and that the treatment described can be carried out as a continuous operation or as a batch operation in a simple and practical manner.

It will be understood that changes may be made in the details of composition and operation without departing from the spirit of the invention, especially as defined in the following claims.

I claim:

1. In the method for treating blood to effect one of the functions of adding and subtracting ingredients with respect thereto, the steps of contacting the blood with an oleaginous carrier liquid in liquid-liquid surface contact one with the other without emulsification, wherein the oleaginous carrier liquid is characterized by a synthetic or natural oil having a low specific solubility, is immiscible with the blood, and has a specific gravity which differs from that of blood for clean separation therebetween, which has a high surface tension for maximizing surface contact between the oleaginous material and the blood and which does not materially affect the blood cells or the rupture or removal of the blood platelets, allowing the treated blood to separate from the immiscible oleaginous carrier liquid, and removing the separated blood from the oleaginous carrier liquid.

2. The method as claimed in claim 1 in which the blood is passed dropwise through the oleaginous liquid for liquid-liquid contact therewith.

3. The method as claimed in claim 1 in which the blood is spread as a thin film over the surface of a suitable support extending through at least a portion of the oleaginous liquid for passage as a thin film through the oleaginous liquid for liquid-liquid contact.

4. The method as claimed in claim 1 in which the blood and oleaginous liquid are passed in countercurrent flow for liquid-liquid contact.

5. The method as claimed in claim 1 in which the oleaginous carrier liquid is a mineral oil.

6. The method as claimed in claim 1 in which the oleaginous carrier liquid is a petroleum oil.

7. The method as claimed in claim 1 in which the oleaginous carrier liquid is a vegetable oil selected from the group consisting of saturated and unsaturated vegetable oils.

8. The method as claimed in claim 1 in which the oleaginous carrier liquid is a triglyceride of a fatty acid having from 12 to 24 carbon atoms.

9. The method as claimed in claim 1 in which the oleaginous carrier liquid has a cationic modification.

10. The method as claimed in claim 1 in which the oleaginous carried liquid has an anionic modification.

11. The method as claimed in claim 1 in which the oleaginous carrier liquid is substituted with amino groups.

12. The method as claimed in claim 1 which includes the steps of contacting the oleaginous carrier liquid with an oxygen containing gas to increase the concentration of oxygen in the oleaginous liquid before liquid-liquid contact with the blood and then contacting the blood with the oxygenated oleaginous liquid to oxygenate the blood.

13. The method as claimed in claim 1 in which the cholesterol is removed from the blood by liquid-liquid contact between the blood and an unsaturated oil.

14. The method as claimed in claim 1 in which cholesterol and bilirubin are removed from the blood by liquid-liquid contact between the blood and an anionic modification of an oleaginous liquid.

15. The method as claimed in claim 1 in which cholesterol and bilirubin are removed from the blood by liquid-liquid contact between the blood and an oleaginous liquid containing an amine group selected from the group consisting of primary, secondary and tertiary amines.

16. The method as claimed in claim 1 in which the oleaginous material is selected from the group consisting of corn oil, peanut oil, cottonseed oil, olive oil, soya oil, linseed oil, oiticica oil, safflower seed oil, chinawood oil, triglycerides of oleic acid, triglycerides of stearic acid, and triglycerides of palmitic acid.

17. The method as claimed in claim 1 in which glutethimide and other drugs having barbituate base are removed from the blood by liquid-liquid contact between the blood and a vegetable oil.

18. The method as claimed in claim 14 in which the vegetable oil is corn oil.

19. The method as claimed in claim 1 in which phosphorus compounds are removed from the blood by liquid-liquid contact between the blood and cationic modified oleaginous liquid.

20. The method as claimed in claim 19 in which the oleaginous liquid contains $SO_3$ groups.

References Cited

UNITED STATES PATENTS 2,761,563  9/1956  Waterman et al. _____ 210—21

FOREIGN PATENTS 1,012,015  12/1965  Great Britain _____ 210—21

OTHER REFERENCES

Chemical and Engineering News, June 16, 1969, p. 45.

RICHARD L. HUFF, Primary Examiner

U.S. Cl. X.R.

23—258.5; 28—214; 210—21, 511